J. J. MULCONROY & E. S. MORRIS.
HOSE COUPLING.
APPLICATION FILED MAY 7, 1912.
1,066,214.
Patented July 1, 1913.
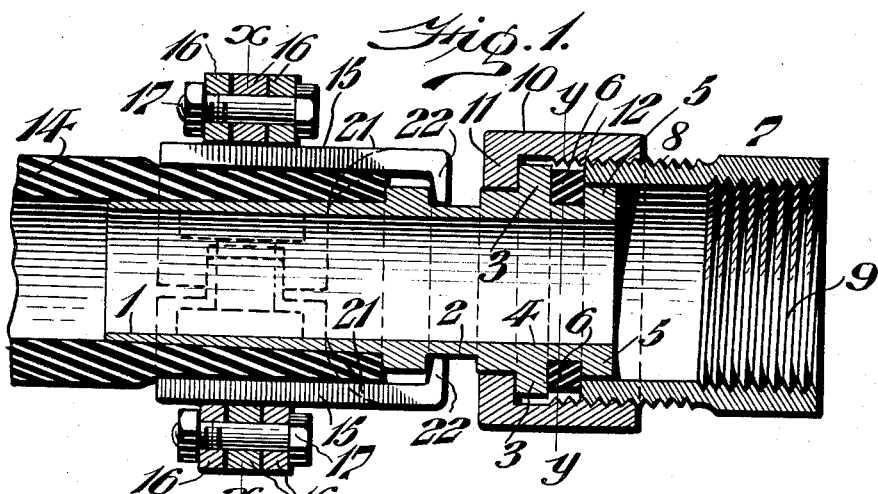
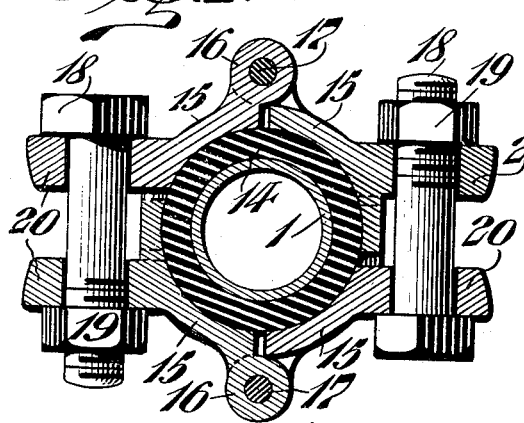
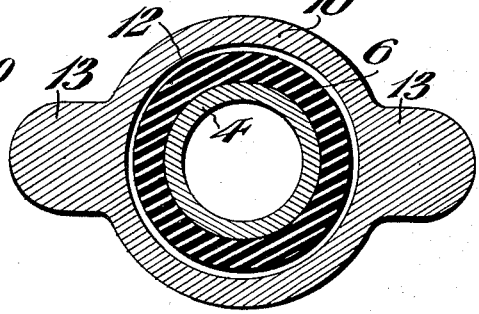
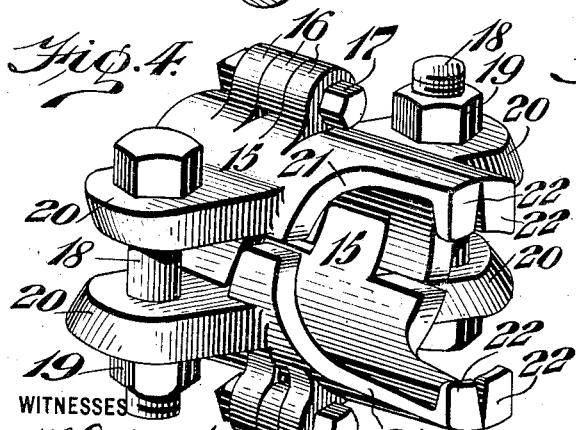
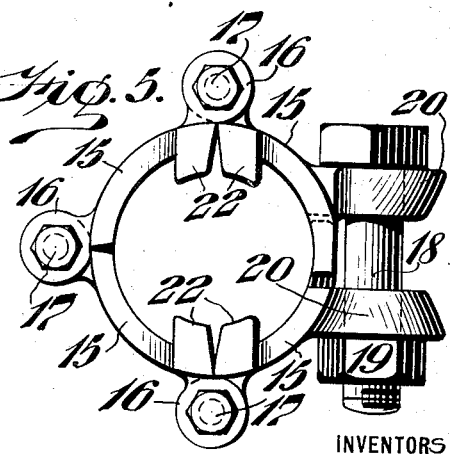
WITNESSES
H. Dieterich
P. F. Nagle
INVENTORS
James J. Mulconroy
Edwin S. Morris
BY Wiedersheim & Fairbanks
ATTORNEYS

UNITED STATES PATENT OFFICE.

JAMES J. MULCONROY AND EDWIN S. MORRIS, OF PHILADELPHIA, PENNSYLVANIA.

HOSE-COUPLING.

1,066,214.  Specification of Letters Patent.  Patented July 1, 1913.

Application filed May 7, 1912. Serial No. 695,624.

*To all whom it may concern:*

Be it known that we, JAMES J. MULCONROY and EDWIN S. MORRIS, both citizens of the United States, residing in the city and county of Philadelphia, State of Pennsylvania, have invented a new and useful Hose-Coupling, of which the following is a specification.

Our invention consists of an improved hose-coupling having improved means for retaining the packing washer or gasket.

It further consists of improved means for securing the hose to the nipple or stem of the coupling.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

In said annexed drawings:—Figure 1 represents an axial section of our improved hose-coupling. Fig. 2 represents a transverse section on the line $x$—$x$ in Fig. 1. Fig. 3 represents a transverse section on the line $y$—$y$ in Fig. 1. Fig. 4 represents a perspective view of the clamp for securing the stem or nipple of the coupling in the hose. Fig. 5 represents an end view of another form of clamp.

Similar numerals of reference indicate corresponding parts in the figures.

Referring to the drawings, the numeral 1 indicates a nipple or stem over which the end of the hose is slipped. Said stem is formed with a circumferential groove 2, and a flange, 3, near its end. The neck, 4, of said stem has a circumferential flange, 5, forming with the former larger flange 3 a circumferential groove into which a yielding washer or gasket, 6, is slipped. A spud, 7, has an externally screw-threaded end, 8, and an internally screw-threaded end 9, by means of which connection may be made to a source of fluid or to the tool or implement to which the fluid is to be conveyed, or said end may be otherwise constructed to form whatever connection is desired. A union or nut, 10, engages the large flange of the stem with its inwardly projecting flange, 11, and has an internal screw-thread, 12, which engages the externally threaded end of the spud, thus drawing the end of the latter against the gasket. The nut has lateral projections, 13, admitting of good hand-hold in turning the nut to make the coupling, and offering projections which may be struck by a hammer in tightening or loosening the nut.

The end of the hose, 14, is slipped over the nipple or stem, and is held in place by a clamp encircling the same. Said clamp is composed of a number of sections, 15, in the principally illustrated instance, four, hinged together by ears, 16, and pins, 17, and drawn upon the hose by means of bolts, 18, and nuts, 19, passing through ears, 20, upon the sections. The sections have arms, 21, formed with lips, 22, which engage the circumferential groove 2 of the stem. By tightening the nuts upon the bolts, the several sections of the clamp are drawn together upon the hose to clamp it tightly upon the stem from all sides.

In Fig. 5 of the drawings is disclosed a clamp composed of four sections, hinged together and clamped by one bolt and one nut, only, but otherwise operating in exactly the same manner as the clamp illustrated in the principal figures of the drawings.

In hose-couplings of this type, as heretofore made, the end of the spud has either had a ground fit against the face of the large flange upon the stem, or a gasket has been placed against such face, but without any means for retaining it. Where a ground fit has been employed, such fit has been liable to be quickly destroyed by dirt and grit entering between the surfaces, causing leakage, and where an unsecured gasket or washer has been employed, the same has been liable to be lost when the hose has been uncoupled and dragged over the ground or otherwise moved about. This present coupling is principally intended for use with hose employed for conveying high-pressure fluids, such as compressed air for pneumatic tools and hot water under high pressure, and the importance of a tight joint in the coupling is evident. Consequently, a ground joint between the end of the spud and the flange of the stem is not liable to give permanent service, and the loss of a gasket or washer disables the coupling and creates inconvenience if distant from a source of supply of the same. It is for the purpose of providing against such troubles that we construct the stem with the additional flange which holds the washer in place and prevents the same from being lost when the hose is uncoupled.

As the coupling is principally intended for hose carrying fluids under high pressures, as above stated, it is equally important that the connection of the stem with the hose shall be as strong as possible, that there shall be no chance for the coupling blowing off under fluid pressure. Clamps have been made from two sections provided with arms and lips engaging a circumferential groove in the stem, and having bolts and nuts drawing such sections together, but a clamp thus formed from two sections compresses the hose from two opposite sides, only, and expands the hose at the joints between the sections, whereby leakage at such points occurs, as also the hose will wear unevenly on account of the unequal compression. By making the clamp in a number of sections greater than two, the hose will be uniformly clamped from all sides and will form a tight attachment for the hose and will not wear the hose unevenly.

The coupling does not consist of more disconnected parts than the older form of coupling but will serve more satisfactorily.

Other modes of applying the principle of my invention may be employed for the modes herein explained. Change may therefore be made as regards the mechanism thus disclosed, provided the principles of construction set forth, respectively, in the following claim are employed.

Having thus described our invention what we claim as new and desire to secure by Letters Patent, is:—

In a hose-coupling, a stem formed with a circumferential flange and with a neck having a circumferential flange of smaller extent than said first mentioned flange, said flanges forming a groove or channel with right-angled walls, a gasket fitting in said groove and positively held therein and having a portion thereof projecting beyond said second mentioned flange, a spud having a flat end seated against the projecting portion of said gasket, the inner wall of the spud surrounding the second mentioned flange, whereby inward movement of said spud with respect to said first mentioned flange is freely permitted, said spud being formed with external screw threads, and a nut having an inwardly projecting flange engaging the first mentioned flange of the stem and having an internal screw thread engaging the threaded portion of the spud, whereby the end of spud is guided between the said nut and the second flange to be properly brought into engagement with the said gasket and the latter is compressed between the same and the right-angled wall of the said first mentioned flange, said nut being rotatably connected with said stem to project over said gasket when released from engagement with said spud.

JAMES J. MULCONROY.
EDWIN S. MORRIS.

Witnesses:
GEORGE J. HOLDEN,
HOWARD PETERMAN.

---

Copies of this patent may be obtained for five cents each, by addressing the "Commissioner of Patents, Washington, D. C."